United States Patent
Kassai et al.

(10) Patent No.: US 6,478,377 B2
(45) Date of Patent: Nov. 12, 2002

(54) JUVENILE SAFETY CAR SEAT

(75) Inventors: Kenzou Kassai, Osaka (JP); Keiji Inoue, Osaka (JP)

(73) Assignee: Aprica Kassai Kabushikikaisha, Osaka (JP)

( * ) Notice: Subject to any disclaimer, the term of this patent is extended or adjusted under 35 U.S.C. 154(b) by 0 days.

(21) Appl. No.: 09/737,364

(22) Filed: Dec. 14, 2000

(65) Prior Publication Data

US 2001/0011838 A1 Aug. 9, 2001

(30) Foreign Application Priority Data

Feb. 7, 2000 (JP) .................................. 2000-029417(P)
May 25, 2000 (JP) .................................. 2000-154768(P)

(51) Int. Cl.$^7$ ................................................ A47C 1/08
(52) U.S. Cl. ..................................... 297/256.1; 297/407
(58) Field of Search ............................. 297/250.1, 464, 297/256.11, 256.1, 353, 406, 407

(56) References Cited

U.S. PATENT DOCUMENTS

| | | | |
|---|---|---|---|
| 5,098,157 A | * | 3/1992 | Surot |
| 5,494,331 A | | 2/1996 | Onishi et al. |
| 5,496,092 A | * | 3/1996 | Williams et al. |
| 5,645,317 A | * | 7/1997 | Onishi et al. |
| 5,810,445 A | * | 9/1998 | Surot |
| 6,030,047 A | * | 2/2000 | Kain |
| 6,045,183 A | * | 4/2000 | Weber |
| 6,135,553 A | * | 10/2000 | Lovie et al. |
| 6,170,911 B1 | | 1/2001 | Kassai et al. |
| 6,196,629 B1 | | 3/2001 | Onishi et al. |

FOREIGN PATENT DOCUMENTS

| | | |
|---|---|---|
| DE | 4329755 | 3/1995 |
| DE | 19755526 | 2/1999 |
| EP | 155784 * | 9/1985 |
| EP | 0635394 | 1/1995 |
| WO | WO89/01423 | 2/1989 |

OTHER PUBLICATIONS

U. S. patent application No. 09/496,151, filed Feb. 1, 2000, by Kenzou Kassai et al.; entitled Juvenile Safety Car Seat, Protector, Protector for Child–Care Instrument, Child–Care Instrument, and Bed for Neonate
U. S. patent application No. 09/919,310, filed Jul. 31, 2001; by Kenzou Kassai et al., entitled: Child Seat With Movable Side Head Guards.

* cited by examiner

Primary Examiner—Milton Nelson, Jr.
(74) Attorney, Agent, or Firm—W. F. Fasse; W. G. Fasse

(57) ABSTRACT

A juvenile safety car seat has a seat portion and a backrest portion forming a support and defining a support space for supporting a child. A pair of side guards are outwardly movably provided on left and right sides of the backrest portion for protecting the head and the shoulder regions of the child. The lower portions of the side guards, which protect the child's shoulders, have a greater range of outward lateral movement than the upper portions of the side guards, which protect the child's head. A vertical position adjusting mechanism for adjusting the vertical position of the backrest portion is provided between the seat portion and the backrest portion. The car seat can be selectively adjusted to suit the growth state of the child.

23 Claims, 20 Drawing Sheets

100

JUVENILE SAFETY CAR SEAT

BACKGROUND OF THE INVENTION

1. Field of the Invention

The present invention relates to a juvenile safety car seat, and more specifically, it relates to the structure of a child & junior seat comprising a seat portion and a backrest portion for supporting a juvenile.

2. Description of the Prior Art

A juvenile safety car seat fixed with a seat belt provided on a car for supporting a juvenile (including a neonate, a baby, an infant and a schoolchild) with a safety belt provided on the juvenile safety car seat is generally referred to as a baby & child seat, while another juvenile safety car seat fixed to a seat of a car along with a juvenile with a seat belt provided on the car is generally referred to as a junior seat or a booster seat. Still another juvenile safety car seat referred to as a child & junior seat is also developed as that having both supporting methods.

While the baby & child seat is widely developed in general, school-age children are also obliged to use the juvenile safety car seat according to the most recent laws and regulations, and it is urgently necessary to develop a child & junior seat also directed to school-age children with higher safety and comfortableness (or comfort).

SUMMARY OF THE INVENTION

An object of the present invention is to provide a juvenile safety car seat excellent in safety and comfortableness.

A juvenile safety car seat according to the present invention, comprising a seat portion and a backrest portion for supporting a juvenile in a car, comprises a pair of side guards outwardly movable provided on both sides of the aforementioned backrest portion for protecting the head region and the shoulder regions of the aforementioned juvenile.

According to the aforementioned structure of the present invention, a support space can be brought into the optimum state in response to growth of the head region and the shoulder regions of the juvenile due to the provision of the outwardly movable side guards. Consequently, the juvenile safety car seat can be improved in safety and comfortableness.

According to the present invention, the aforementioned side guards are preferably provided to be capable of increasing the distances between the side guards and the aforementioned shoulder regions of the aforementioned juvenile while keeping the distances between the side guards and the aforementioned head region of the aforementioned juvenile substantially constant. As a specific mode, the aforementioned side guards are so mounted that upper end regions are rotatable with respect to the aforementioned backrest portion for outwardly opening lower end regions of the aforementioned side guards.

From early childhood to school age, the shoulder portions (the breadth of the shoulders) of the juvenile grow at a higher degree than the head portion. Therefore, the support space for the juvenile can be optimally changed by providing the lower end regions of the side guards coming into contact with the shoulder portions to be outwardly openable, thereby further improving the safety and comfortableness of the juvenile safety car seat.

According to the present invention, the aforementioned side guards are preferably provided with an interlocking link mechanism for simultaneously enabling adjustment of the interval or spacing distance between the side guards. According to the present invention, the aforementioned interlocking link mechanism preferably includes a mechanism for outwardly opening only lower end regions of the aforementioned side guards.

The side guards can be simultaneously adjusted by employing this mechanism, thereby improving handleability of the juvenile safety car seat.

According to the present invention, the aforementioned side guards preferably have upper side guards and lower side guards respectively.

A proper space responsive to the shapes of the head region and the shoulder regions of the juvenile can be defined due to this structure, whereby the juvenile safety car seat can protect the juvenile in a more preferable state.

According to the present invention, the juvenile safety car seat is preferably so provided that the quantity of outward movement of the aforementioned lower side guards is greater than the quantity of outward movement of the aforementioned upper side guards.

From early childhood to school age, the shoulder portions (the breadth of the shoulders) of the juvenile grow at a higher degree than the head portion. Therefore, the support space for the juvenile can be optimally changed in response to the growth of the juvenile for further improving the safety and comfortableness of the juvenile safety car seat.

According to the present invention, the aforementioned upper side guards and the aforementioned lower side guards are preferably provided with interlocking link mechanisms for simultaneously enabling adjustment of the intervals or spacing distances between the upper side guards and the lower side guards respectively. Thus, adjustability for the intervals between the side guards can be improved.

According to the present invention, the juvenile safety car seat preferably further comprises a vertical position adjusting mechanism for adjusting the vertical position of the aforementioned backrest portion. The support space can be brought into the optimum state in response to growth of the height of the juvenile by providing this mechanism.

According to the present invention, the aforementioned vertical position adjusting mechanism preferably includes a plate fixed to the aforementioned seat portion and provided to upwardly extend, a guide region provided on the aforementioned backrest portion for guiding the aforementioned plate so that the aforementioned backrest portion is vertically slidable along the aforementioned plate and a fixing device for fixing a selected vertical position of the aforementioned backrest portion. The aforementioned guide region has a receiving space for receiving the aforementioned plate in the range of the thickness of the aforementioned backrest portion.

The backrest portion is vertically slidable along the plate due to this structure, so that the vertical position of the backrest portion can be readily adjusted.

According to the present invention, the aforementioned fixing device preferably includes an elastic member provided on either one of the aforementioned plate and the aforementioned guide region and a plurality of engaging regions vertically provided on the other one of the plate and the guide region for engaging with the aforementioned elastic member.

Thus, the elastic member engages with any of the engaging regions on the basis of the elastic force thereof for fixing the plate and the guiding region, thereby fixing the vertical position of the backrest portion. When adjusting the vertical position of the backrest portion, the engaging regions are moved against the elastic force of the elastic member so that the elastic member successively engages with the engaging regions, whereby the backrest portion can be fixed on a desired vertical position.

According to the present invention, regions coming into contact with the aforementioned head region of the aforementioned juvenile and regions coming into contact with the aforementioned shoulder regions are visually partitioned in the aforementioned side guards. Thus, the juvenile safety car seat can provide a sense of security to the user, thereby improving comfortableness for the user.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The structure of a juvenile safety car seat (hereinafter referred to as a child & junior seat) according to each embodiment of the present invention is now described with reference to the drawings.

First Embodiment

Figure 1:
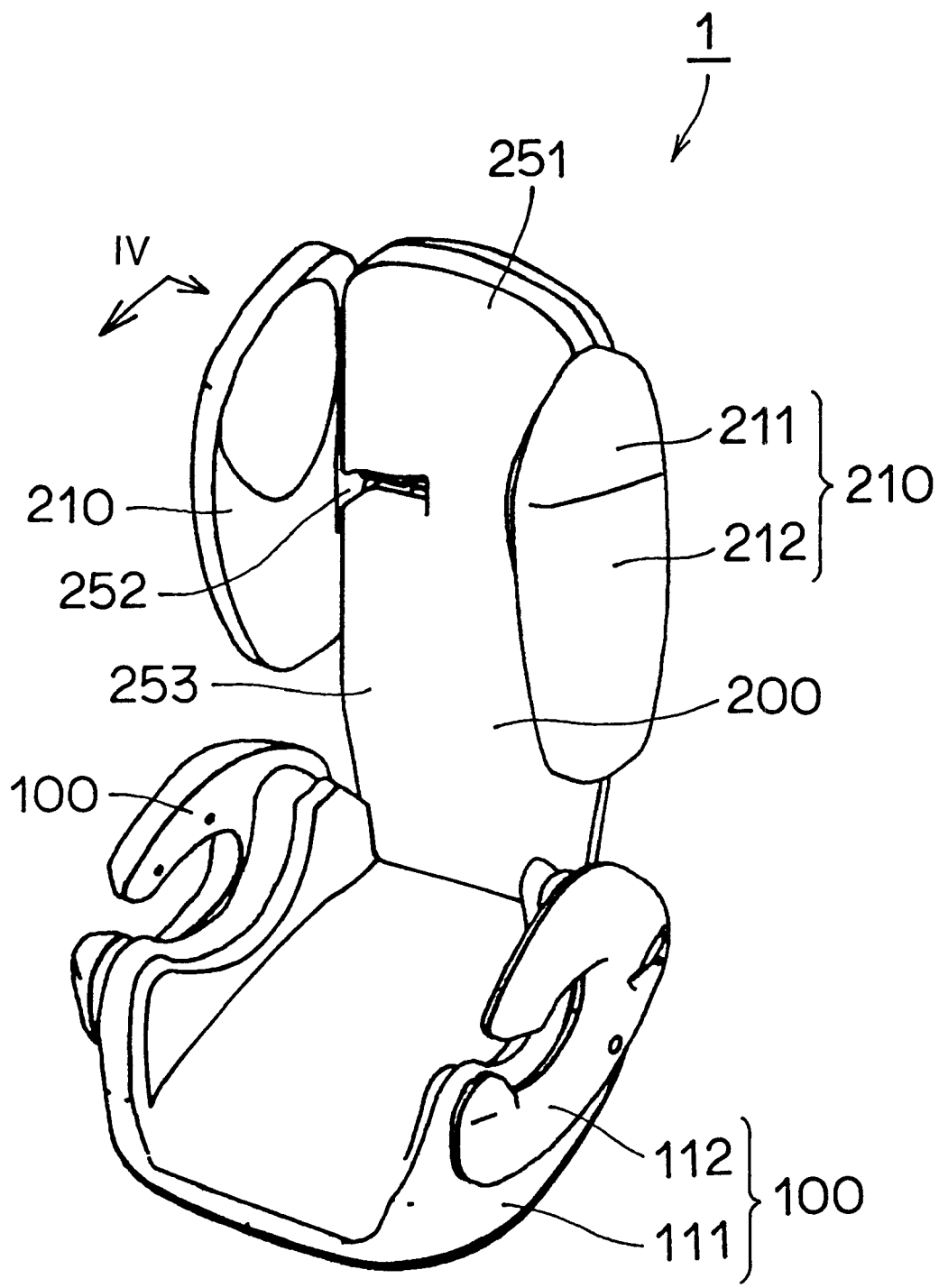
FIG. 1 is a perspective view showing the overall structure of a child & junior seat 1 according to a first embodiment of the present invention.

The structure of a child & junior seat 1 according to a first embodiment of the present invention is now schematically described with reference to FIG. 1. FIG. 1 is a perspective view showing the overall structure of the child & junior seat 1.

Schematic Structure of Child & Junior Seat 1

This child & junior seat 1 comprises a seat portion 100 and a backrest portion 200 forming a support portion defining a support space for receiving a juvenile. The seat portion 100 has a seat body 111 and an adjusting member 112 for adjusting the vertical position of a seat belt (not shown) provided on a car.

The backrest portion 200 includes a head guard region 251 and a backrest region 253, and guide slits 252 for receiving the seat belt (not shown) provided on the car are provided on both sides of the backrest portion 200.

A pair of side guards 210 are outwardly movably provided on both sides of the backrest portion 200, in order to protect the head region and the shoulder regions of a juvenile. Each side guard 210 includes a head protecting pad region 211 protecting the head region of the juvenile and a shoulder protecting pad region 212 largely extending downward from the head protecting pad region 211 for protecting each shoulder region of the juvenile. Further, a vertical position adjusting mechanism (described later) for adjusting the vertical position of the backrest portion 200 is provided between the seat portion 100 and the backrest portion 200.

Figure 2:
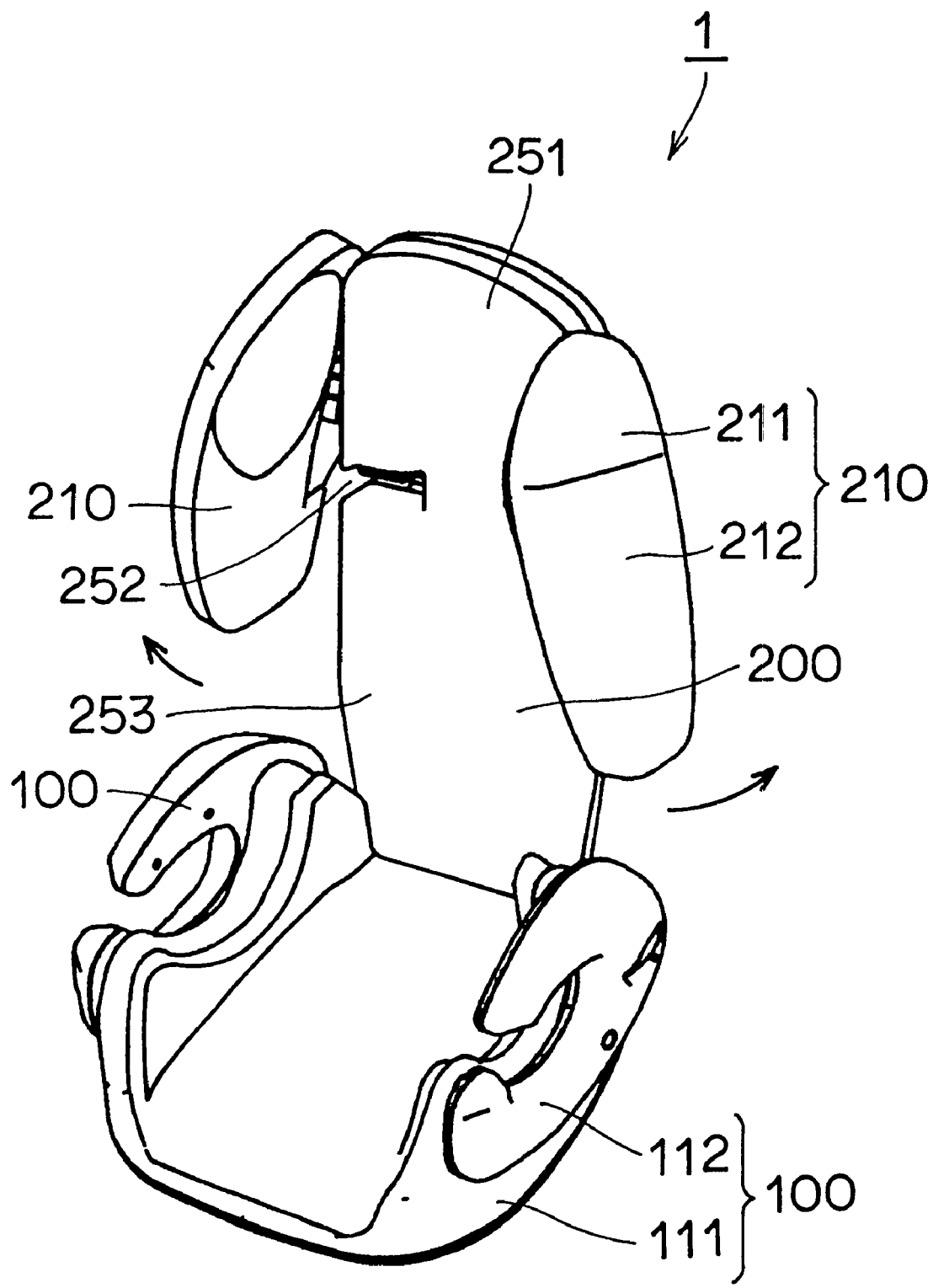
FIG. 2 is a total perspective view showing the child & junior seat 1 in a state outwardly spreading side guards 210.
Figure 3:
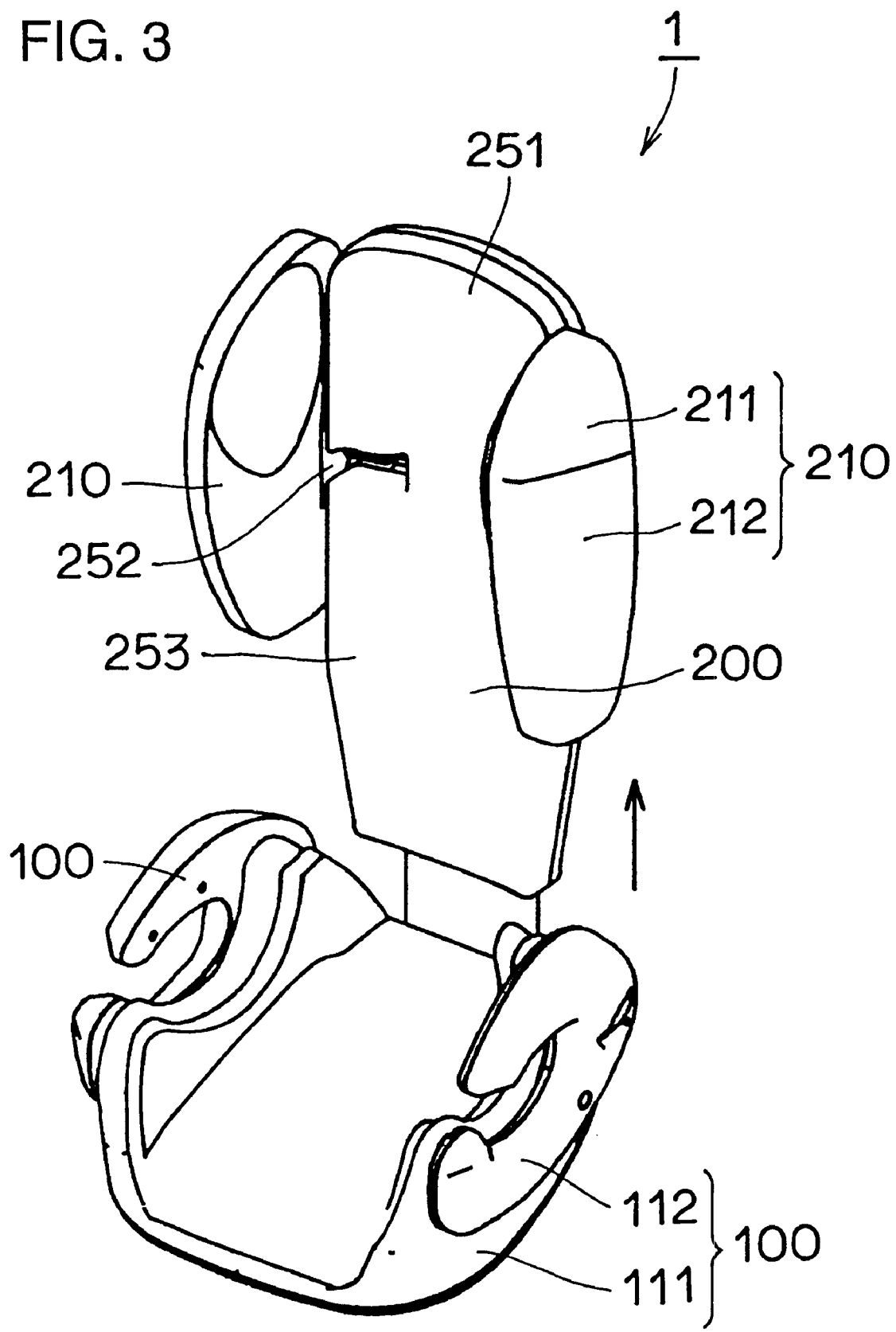
FIG. 3 is a total perspective view showing the child & junior seat 1 in a state pulling up a backrest portion 200.

FIG. 2 is a total perspective view showing the child & junior seat 1 in a state outwardly spreading the side guards 210 along arrows, and FIG. 3 is a total perspective view showing the child & junior seat 1 in a state pulling up the backrest portion 200 along arrow. Thus, the support space can be brought into the optimum state in response to growth of the head region, the shoulder regions and the height of the juvenile by employing the mechanism rendering the side guards 210 outwardly spreadable and the mechanism rendering the vertical position of the backrest portion 200 adjustable, thereby improving safety and comfortableness of the child & junior seat 1.

Interlocking Link Mechanism 220A

Figure 4:
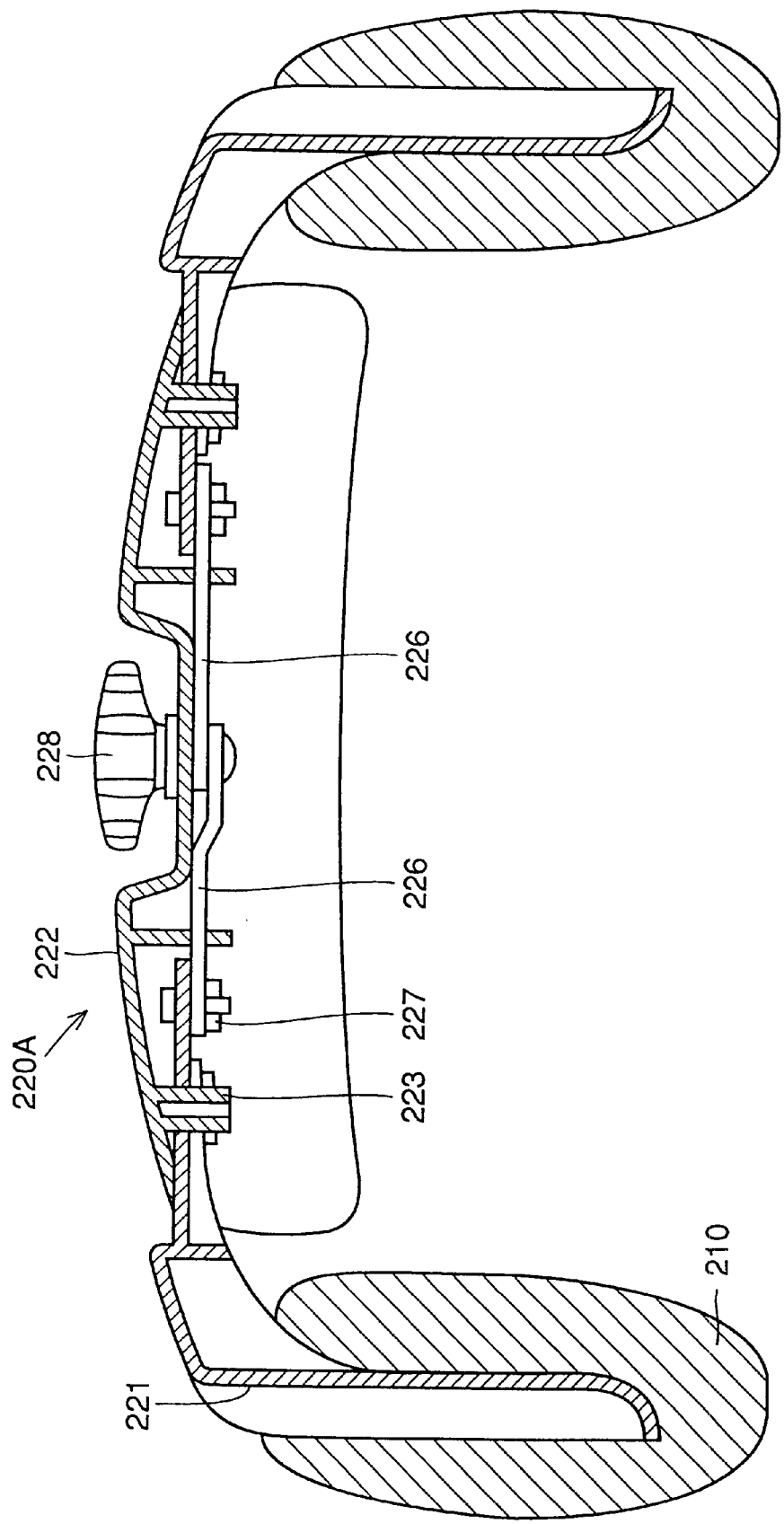
FIG. 4 is a sectional view taken along the line IV in FIG. 1.
Figure 5:
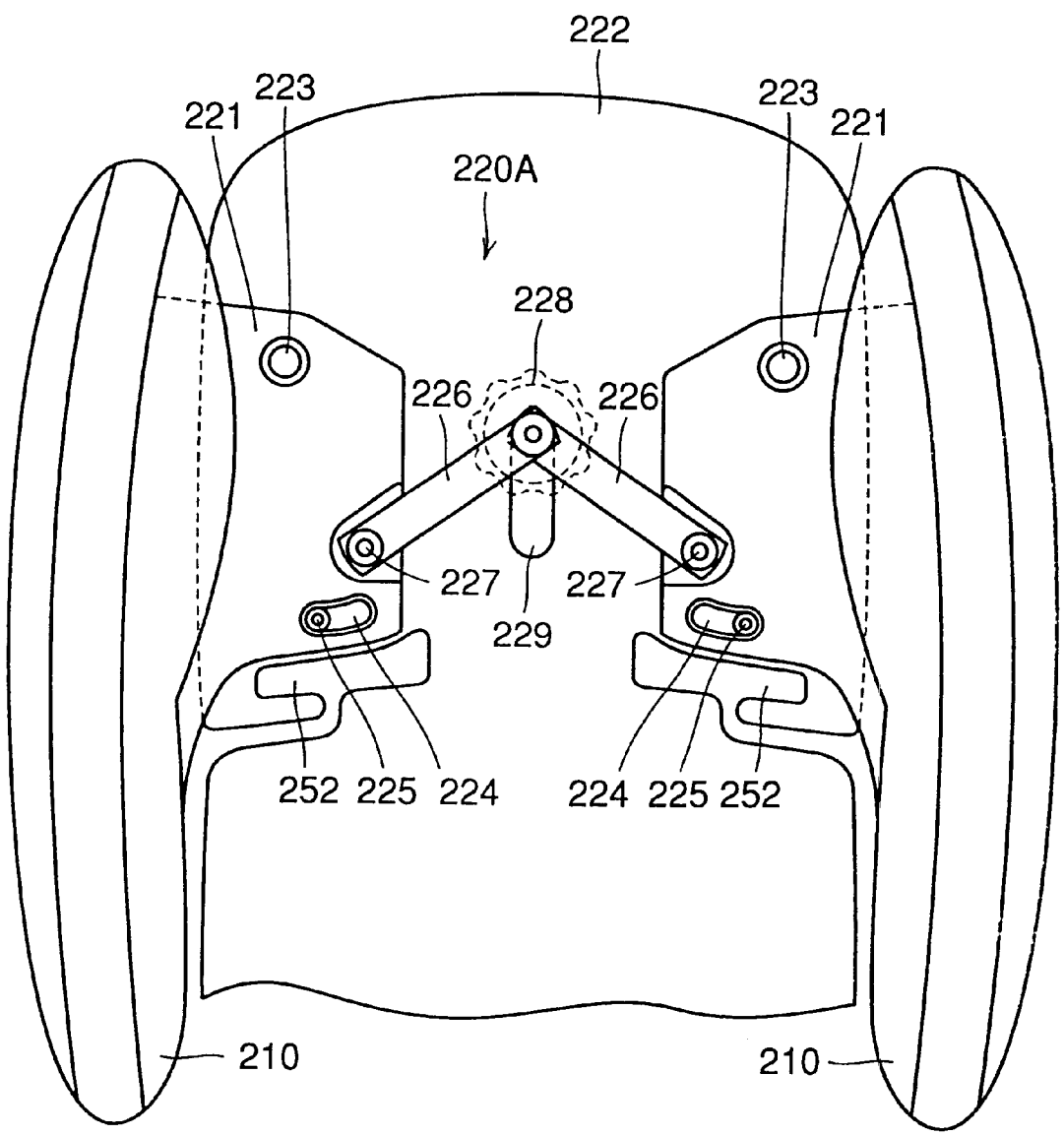
FIG. 5 is a front elevational view showing the child & junior seat 1 in a state closing the side guards 210.
Figure 6:
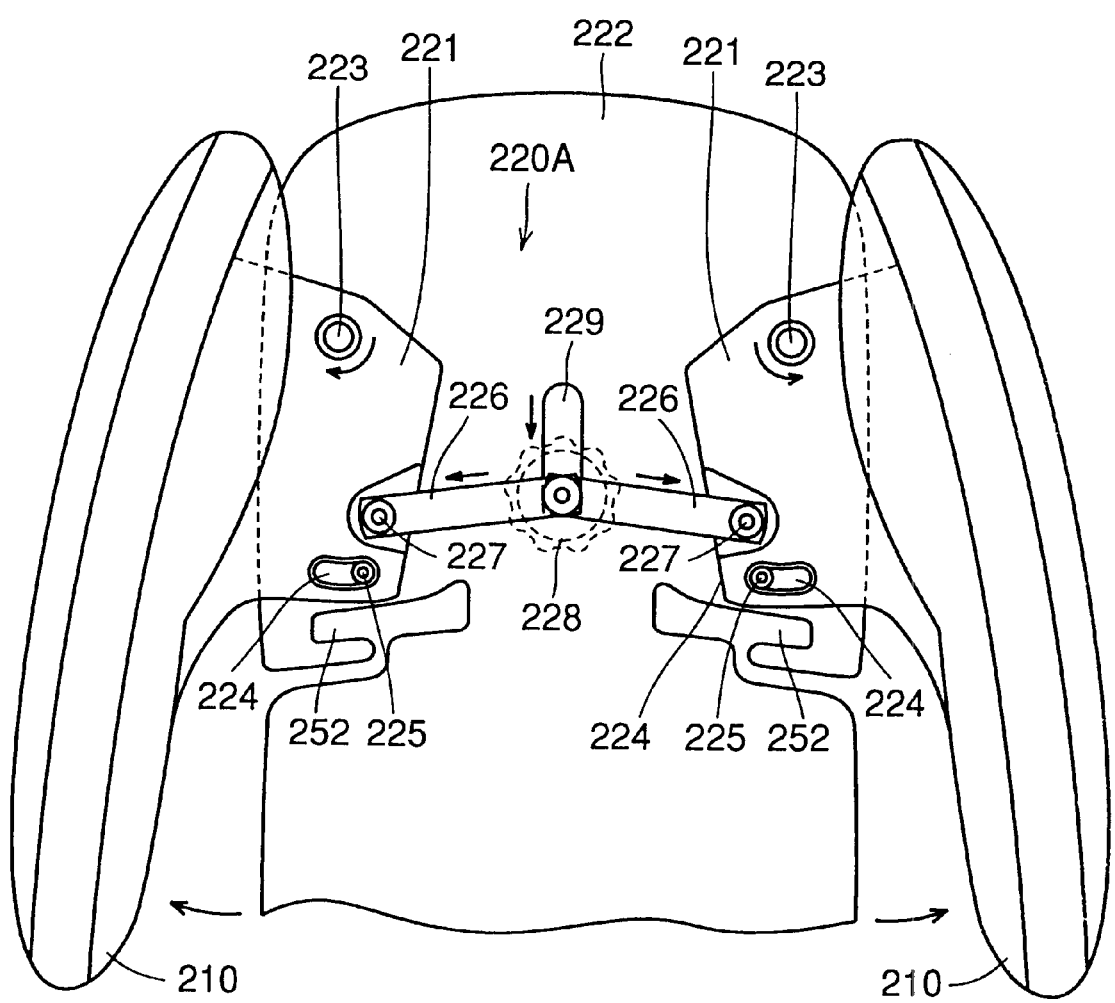
FIG. 6 is a front elevational view showing the child & junior seat 1 in a state opening the side guards 210.

An interlocking link mechanism 220A for mounting the side guards 210 is now described with reference to FIGS. 4 to 6. FIG. 4 is a sectional view taken along the line IV in FIG. 1, FIG. 5 is a front elevational view showing the child & junior seat 1 in a state closing the side guards 210, and FIG. 6 is a front elevational view showing the child & junior seat 1 in a state opening the side guard 210. While the child & junior seat 1 is covered with a cushion member or the like in FIGS. 1 to 3, it is assumed that such a cushion member or the like is detached from the child & junior seat 1 in FIGS. 4 to 6 for convenience of illustration.

Referring to FIGS. 4 and 5, the interlocking link mechanism 220A is provided with side guard frames 221 supporting the side guards 210. The side guard frames 221 are fixed on upper end portions to be rotatable at pivot portions 223 provided on a backrest from 222 of the backrest portion 200, for outwardly opening lower ends of the side guards 210.

First ends of link bars 226 are rotatably fixed to intermediate regions of the side guard frames 221 through pivot portions 227. Second ends of the link bars 226 are fixed to an adjusting nut 228 movable along a vertical slot 299 provided on the backrest frame 222 for selecting position control. The side guard frames 221 are provided with arcuate slots 224 along the tracks of the side guards 210 for limiting the quantities of movement of the side guards 210, and shafts 225 provided on the backrest frame 222 are inserted in these slots 224.

When the adjusting nut 228 is located on the uppermost position of the slot 229 in the interlocking link mechanism 220A having the aforementioned structure, the side guards 210 are most closed as shown in FIG. 5. When the adjusting nut 228 moves to the lowermost position of the slot 229, the link bars 226 simultaneously spread the side guards 210 outward as shown in FIG. 6.

The side guards 210 can be simultaneously adjusted by providing the aforementioned interlocking link mechanism 220A, thereby improving handleability of the child & junior seat 1.

From early childhood to school age, the shoulder portions (the breadth of the shoulders) of the juvenile grow at a higher degree than the head portion. Therefore, the support space for the juvenile can be optimally changed by providing the lower end regions of the side guards 210 coming into contact with the shoulder portions to be outwardly openable, thereby further improving the safety and comfortableness of the juvenile safety car seat.

While the mechanism for interlocking the right and left side guards 210 with each other has been described as a preferable example, a mechanism for adjusting the positions of the side guards 210 independently of each other can alternatively be employed.

Vertical Position Adjusting Mechanism

Figure 7:
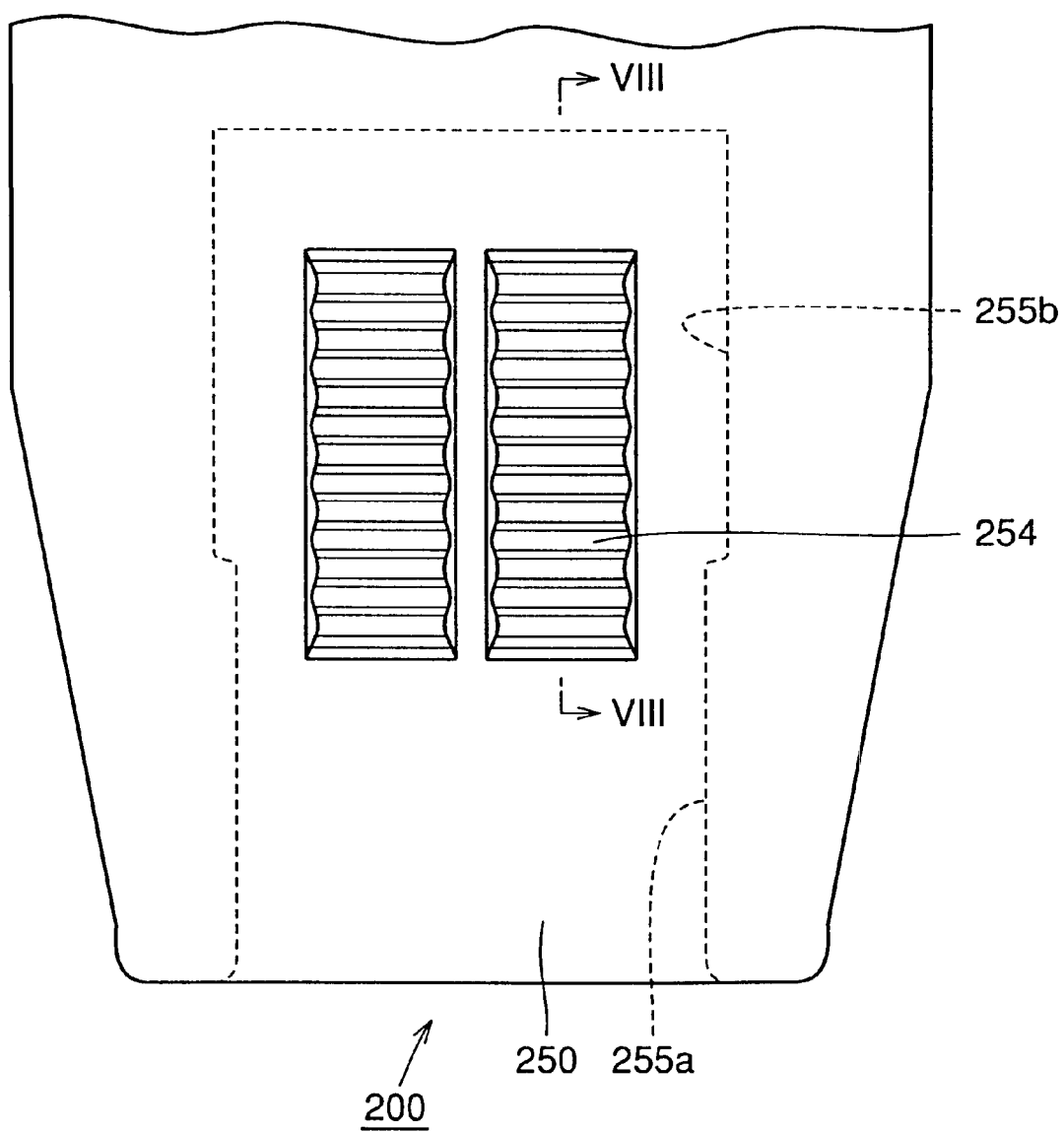
FIG. 7 is a rear elevational view of a lower region 250 of the backrest portion 200.
Figure 8:
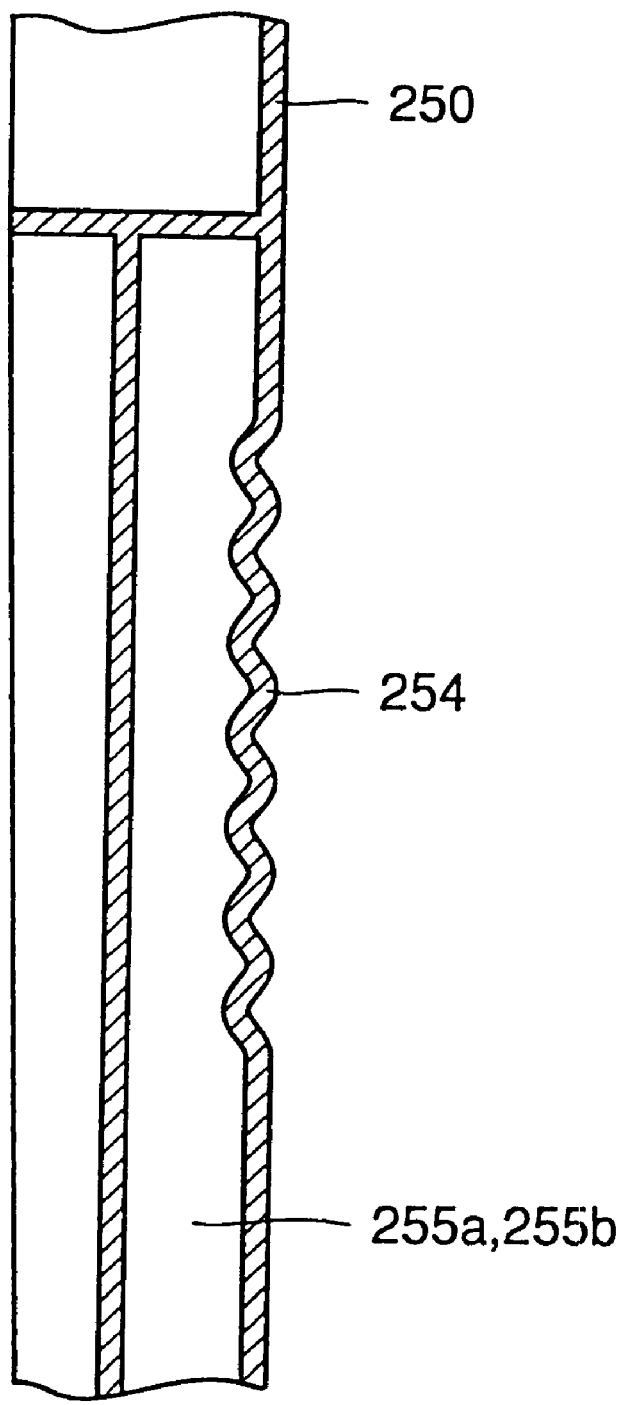
FIG. 8 is a sectional view taken along the line VIII—VIII in FIG. 7.
Figure 9:
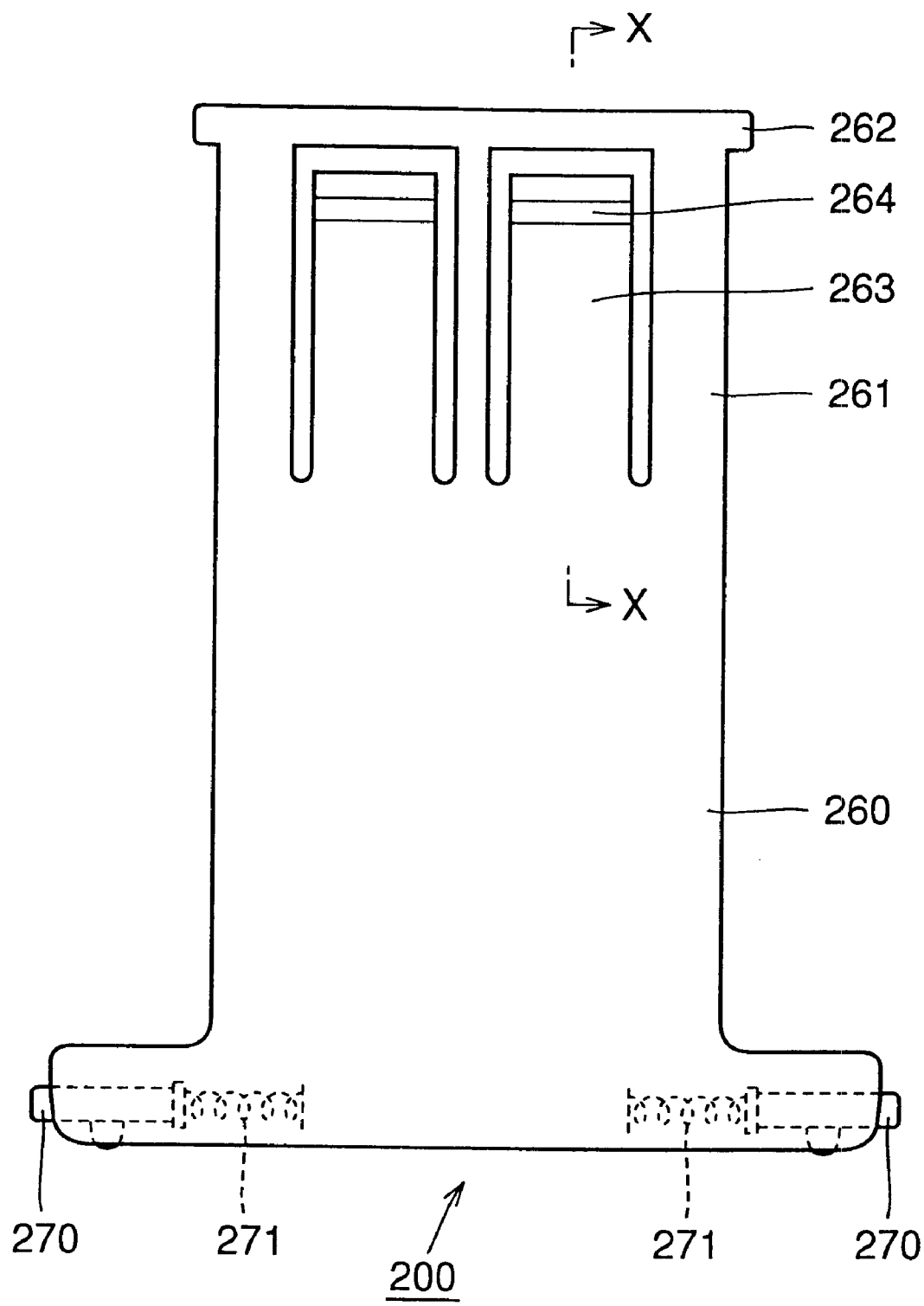
FIG. 9 is a rear elevational view of a plate 260 detachably provided on a seat portion 100.

The structure of a vertical position adjusting mechanism for adjusting the vertical position of the backrest portion 200 is now described with reference to FIGS. 7 to 10. FIG. 7 is a rear elevational view of a lower end region 250 of the backrest portion 200, and FIG. 8 is a sectional view taken along the line VIII—VIII in FIG. 7. FIG. 9 is a rear elevational view of a plate 260 detachably provided on the seat portion 100, and FIG. 10 is a sectional view taken along line X—X in FIG. 9.

Referring to FIGS. 7 and 8, the lower end region 250 of the backrest portion 200 has a guide region defining a space for receiving the plate 260, and this guide region includes a first region 225a substantially identical in width to the plate 260 and a second region 255b larger in width than the first region 255a. A pair of engaging regions 254 consisting of corrugated irregularities along the vertical direction are provided on the back surface of the guide region.

Figure 10:
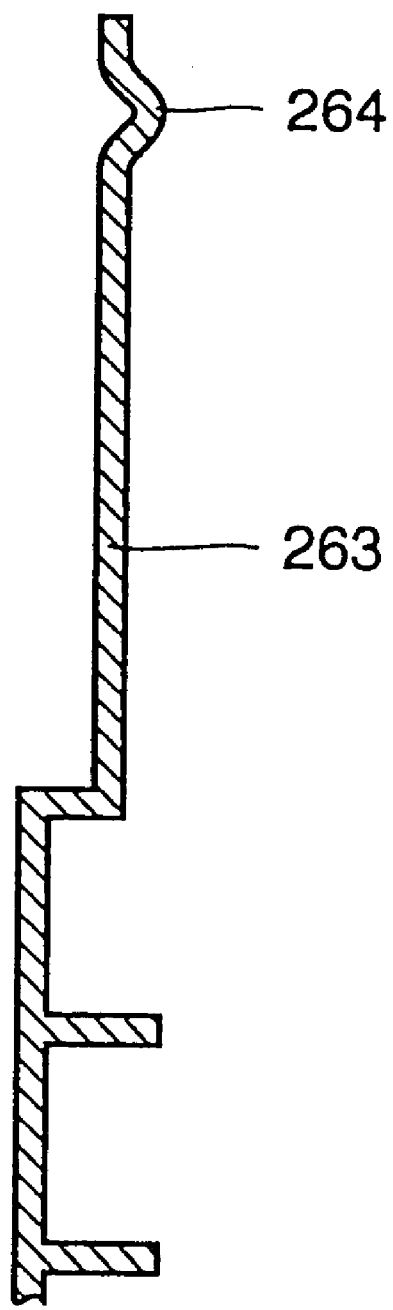
FIG. 10 is a sectional view taken along the line X—X in FIG. 9.

Referring to FIGS. 9 and 10, an upper region 261 of the plate 260 has a pair of tongue-shaped elastic plates 263 provided on forward ends thereof with convex portions 264 engaging with the engaging regions 254.

The plate 260 is further provided on its upper end with an outwardly spreading wide portion 262 engaging with the boundary between the first and second regions 255a and 255b of the guide region for preventing displacement of the backrest portion 200 from the plate 260.

Figure 11:
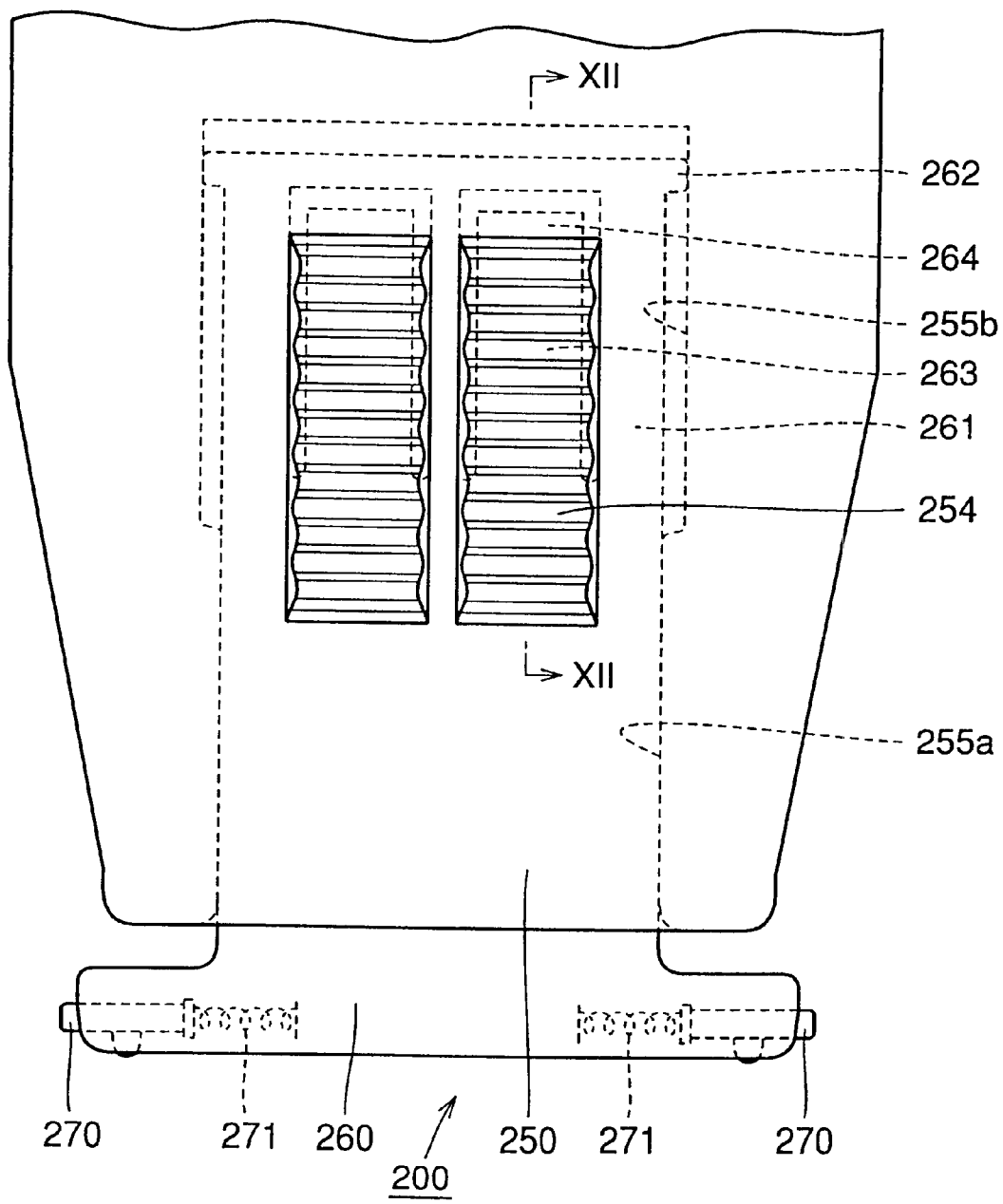
FIG. 11 illustrates the backrest portion 200 inserted in the plate 260.
Figure 12:
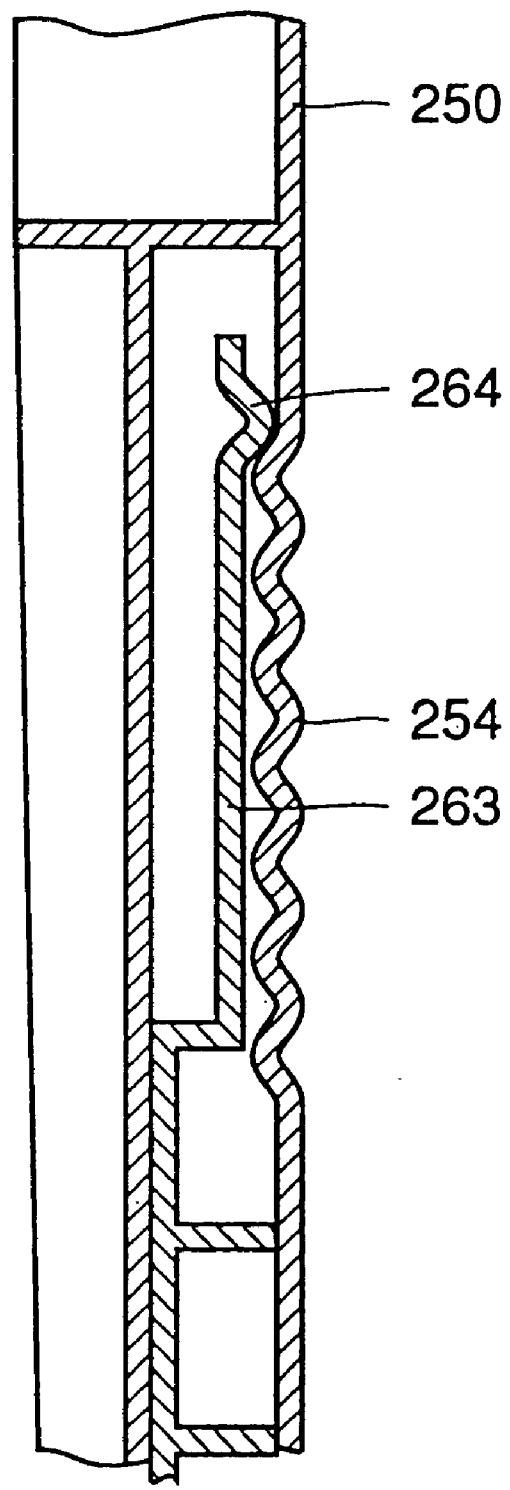
FIG. 12 is a sectional view taken along the line XII—XII in FIG. 11.

FIG. 11 illustrates the backrest portion 200 inserted in the plate 260, and FIG. 12 is a sectional view taken along the line XII—XII in FIG. 11. Referring to FIGS. 11 and 12, the convex portions 264 of the elastic plates 263 engage with the uppermost ends of the engaging regions 254 when the backrest portion 200 is located on the lowermost position.

Figure 13:
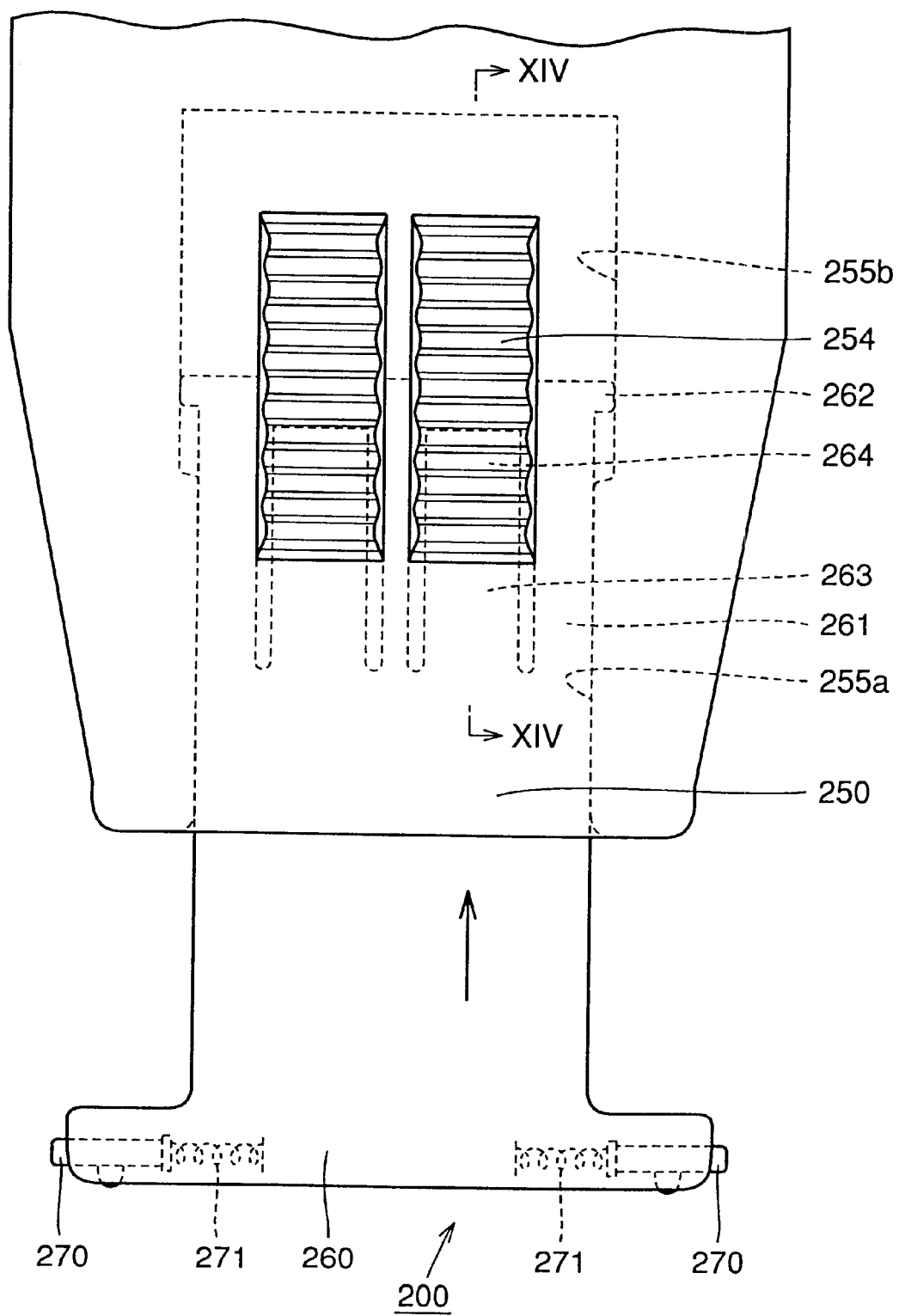
FIG. 13 illustrates the backrest portion 200 in an upwardly pulled state.
Figure 14:
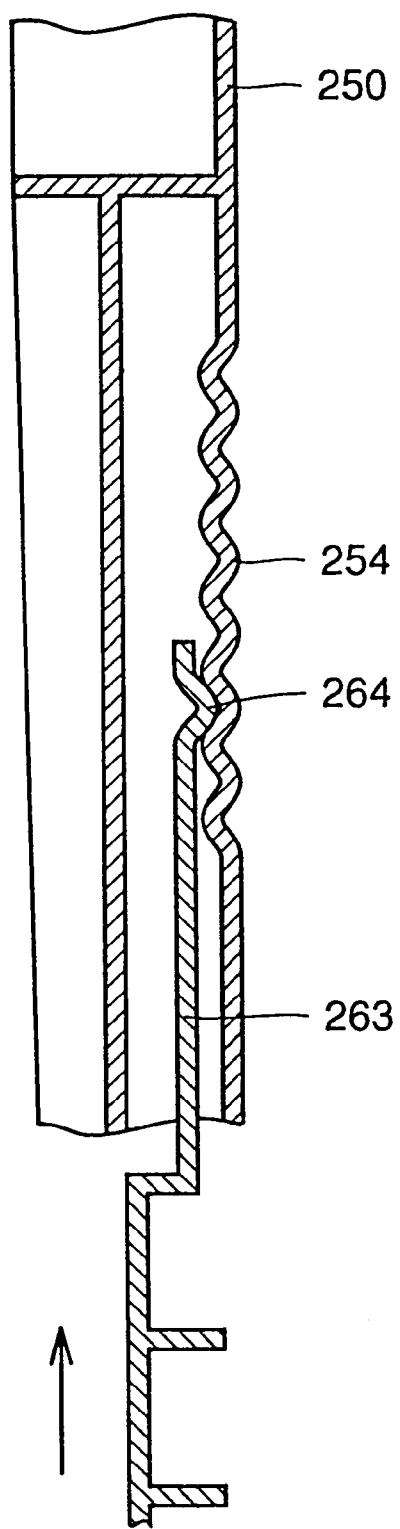
FIG. 14 is a sectional view taken along the line XIV—XIV in FIG. 13.

FIG. 13 shows the backrest portion 200 in an upwardly pulled state, and FIG. 14 is a sectional view taken along the line XIV—XIV in FIGS. 13. Referring to FIGS. 13 and 14, the convex portions 264 of the elastic plates 263 engage with prescribed regions of the engaging regions 254 when the backrest portion 200 is upwardly pulled, for inhibiting the backrest portion 200 from downward movement on the basis of the elastic force of the elastic plates 263.

The plate 260 can be readily attached to/detached from the seat portion 100 by sliding fixing pins 270 provided on the lower end of the plate 260 against coil springs 271.

Thus, when the backrest portion 200 having the engaging regions 254 moves against the elastic force of the elastic plates 263, the elastic plates 263 successively engage with the engaging regions 254 so that the backrest portion 200 can be readily fixed on a desired vertical position.

Figure 15:
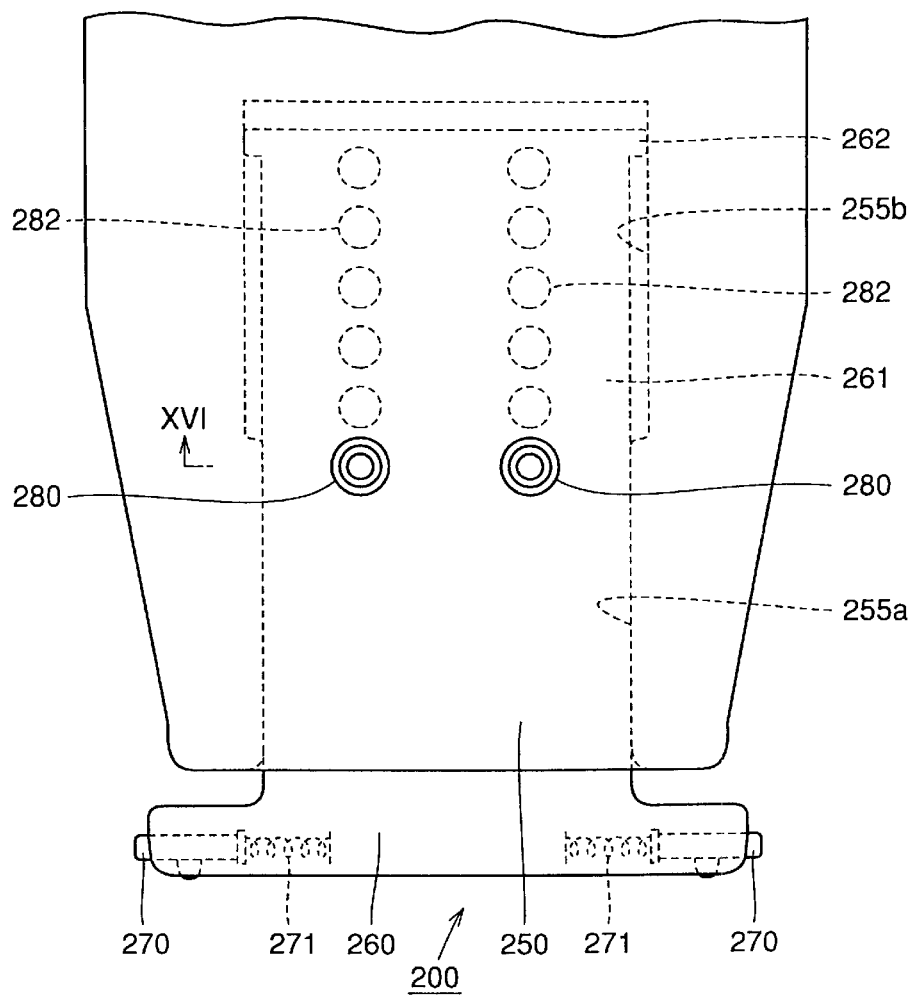
FIG. 15 is a rear elevational view showing another vertical position adjusting mechanism.
Figure 16:
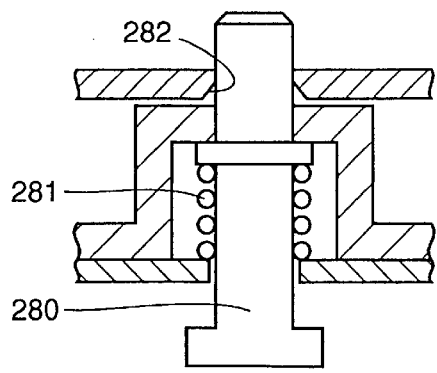
FIG. 16 is a sectional view taken along the line XVI in FIG. 15.
Figure 17:
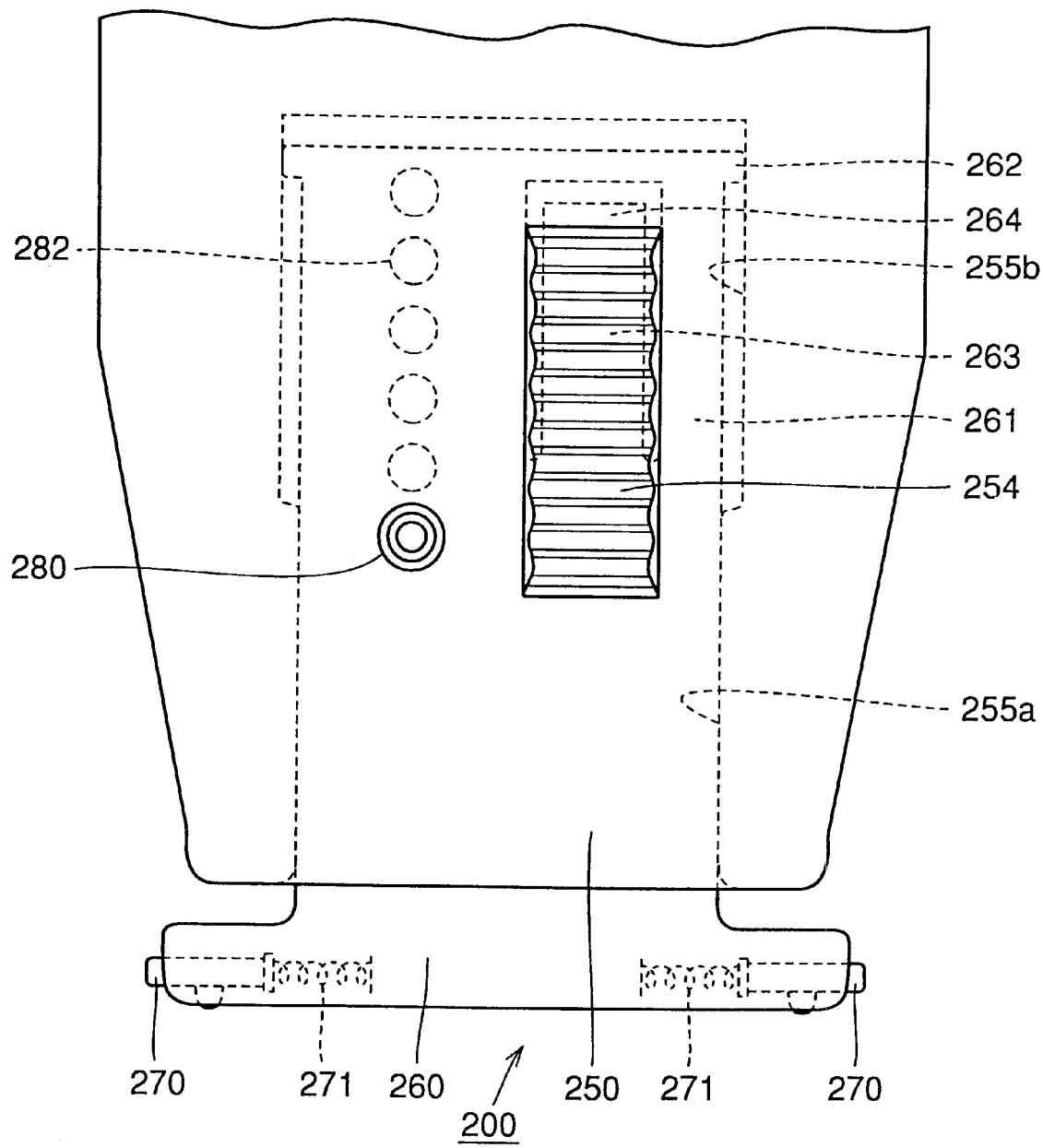
FIG. 17 is a rear elevational view showing still another vertical position adjusting mechanism.

While the backrest portion 200 is fixed through elastic force in the vertical position adjusting mechanism shown in FIGS. 7 to 15, sliding pins 280 extractable against coil springs 281 may alternatively be provided on the lower region 250 of the backrest portion 200 to be inserted in a plurality of location holes 282 provided along the vertical direction of the plate 260 for adjusting the vertical position of the backrest portion 200, a s shown in FIGS. 15 and 16. Further, the aforementioned two mechanisms may be combined with each other for adjusting the vertical position of the backrest portion 200, as shown in FIG. 17.

Second Embodiment

Figure 18:
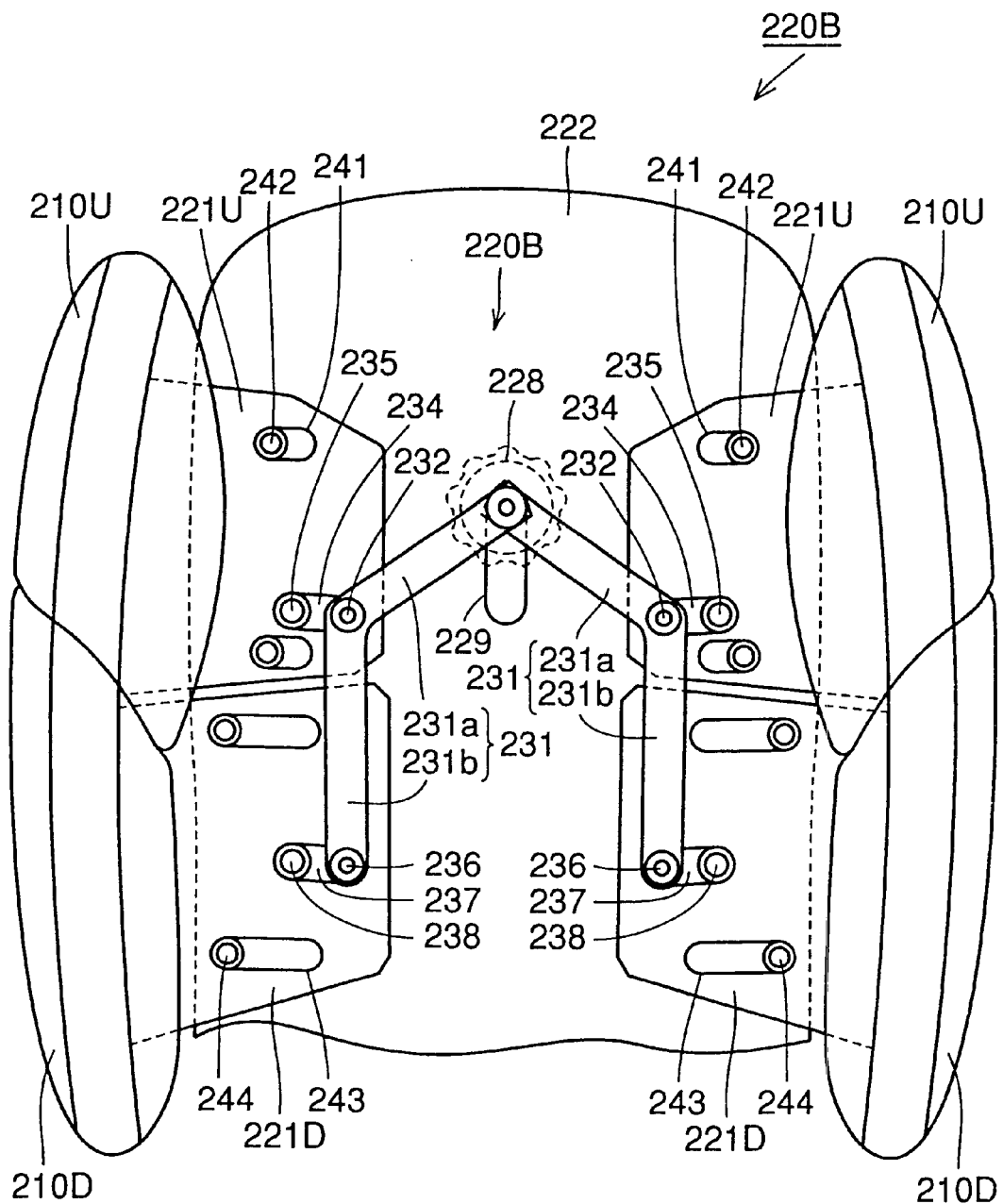
FIG. 18 is a front elevational view showing a child & junior seat 1 according to a second embodiment of the present invention in a state closing side guards 210U and 210D.
Figure 19:
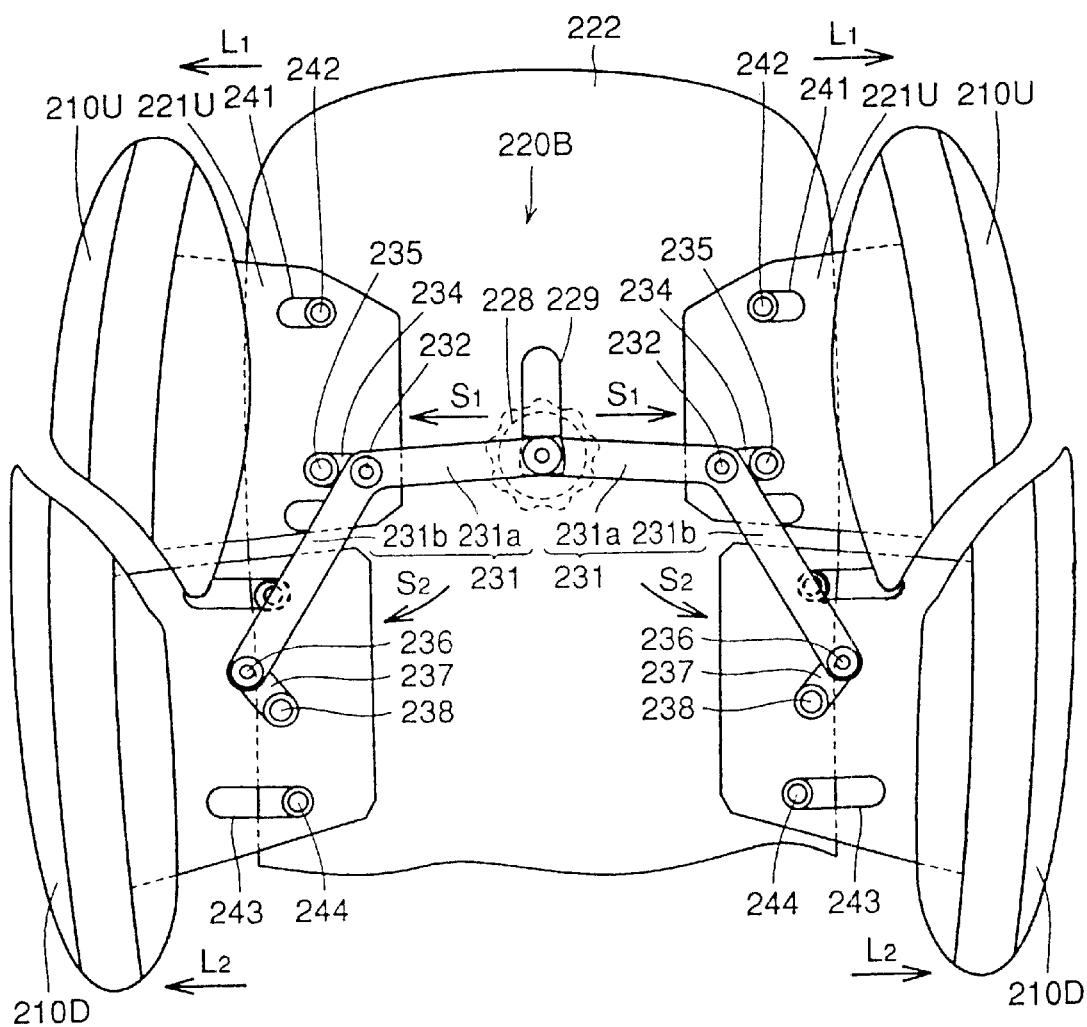
FIG. 19 is a front elevational view showing the child & junior seat 1 according to the second embodiment of the present invention in a state opening the side guards 210U and 210D.
Figure 20:
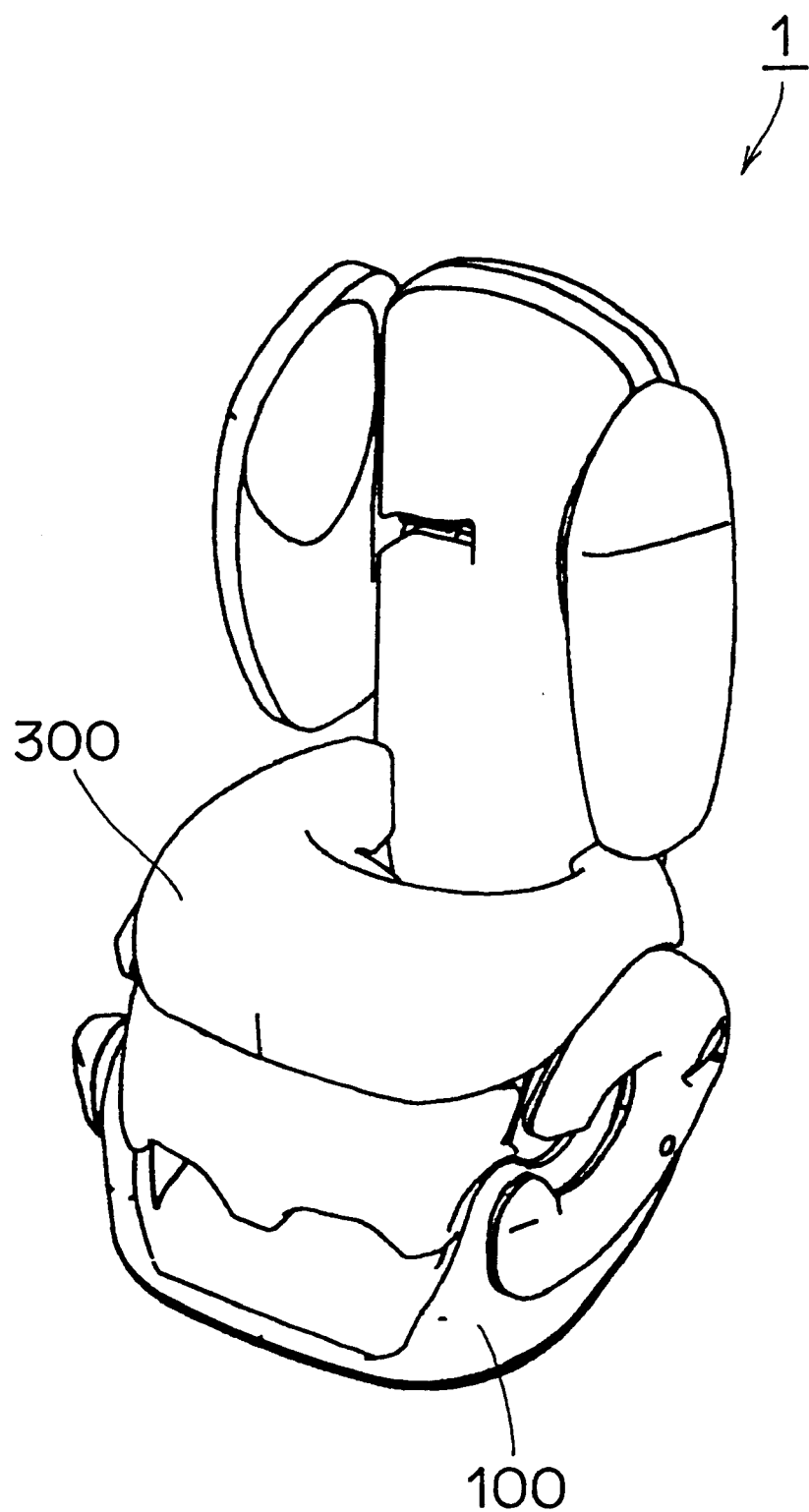
FIG. 20 is a perspective view showing the child & junior seat 1 employed as a child seat.

The structure of a child & junior seat 1 according to a second embodiment of the present invention is now schematically described with reference to FIGS. 18 and 19. The feature of the child & junior seat 1 according to this embodiment resides in the structure of side guards and an interlocking link mechanism therefor, and hence only the structure and the mechanism are described in detail. FIG. 18 is a front elevational view showing the child & junior seat 1 according to this embodiment in a state closing the side guards, and FIG. 19 is a front elevational view showing the child & junior seat 1 in a state opening the side guards. It is assumed that FIGS. 19 and 20 show a state detaching a cushion member or the linked from the child & junior seat 1, for convenience of illustration.

Interlocking Link Mechanism 220B

According to this embodiment, the side guards include upper side guards 210U protecting the head region of a juvenile and lower side guards 210D. The upper side guards 210U are provided with upper plates 221U, and guide pins 242 provided on a backrest frame 222 are engaged with guide holes 241 provided on the upper plates 221U so that the upper side guards 210U are transversely slidable.

Similarly, the lower side guards 210D are provided with lower plates 221D, and guides pins 244 provided on the frame 222 are engaged with guide holes 243 provided on the lower plates 221D so that the lower side guards 210D are transversely slidable.

Link bars 231 couple the upper plates 221U and the lower plates 221D with each other. As shown in FIG. 18, the link bars 231 have V-shaped link plates 231a and 231b.

An adjusting nut 228 movable along a vertical slot 229 provided on the backrest frame 222 for selecting position control is rotatably fixed to forward end portions of the link plates 231a.

First ends of guide plates 234 are rotatably coupled to the cross points of the link plates 231a and 231b with pivot portions 232, and the upper plates 221U are rotatably coupled to second ends of the guide plates 234 with pivot portions 235.

First ends of guide plates 237 are rotatably coupled to forward end portions of the link plates 231b with pivot portions 236, and the lower plates 221D are rotatably coupled to second ends of the guide plates 237 with pivot portions 238.

When the adjusting nut 228 is located on the uppermost position of the slot 229 in the interlocking link mechanism 220B having the aforementioned structure, the side guards 210U and 210D are most closed as shown in FIG. 18. When the adjusting nut 228 moves to the lowermost position of the slot 229, it follows that the link bars 231 simultaneously spread the side guards 210U and 210D. The link bars 231 have the V-shaped link plates 231a and 231b, and hence the pivot portions 235 and 238 move by different quantities so that the quantity (L2) of outward movement of the lower side guards 210D is greater than the quantity (L1) of outward movement of the upper side guards 210U. comfortableness for the user.

Figure 21:
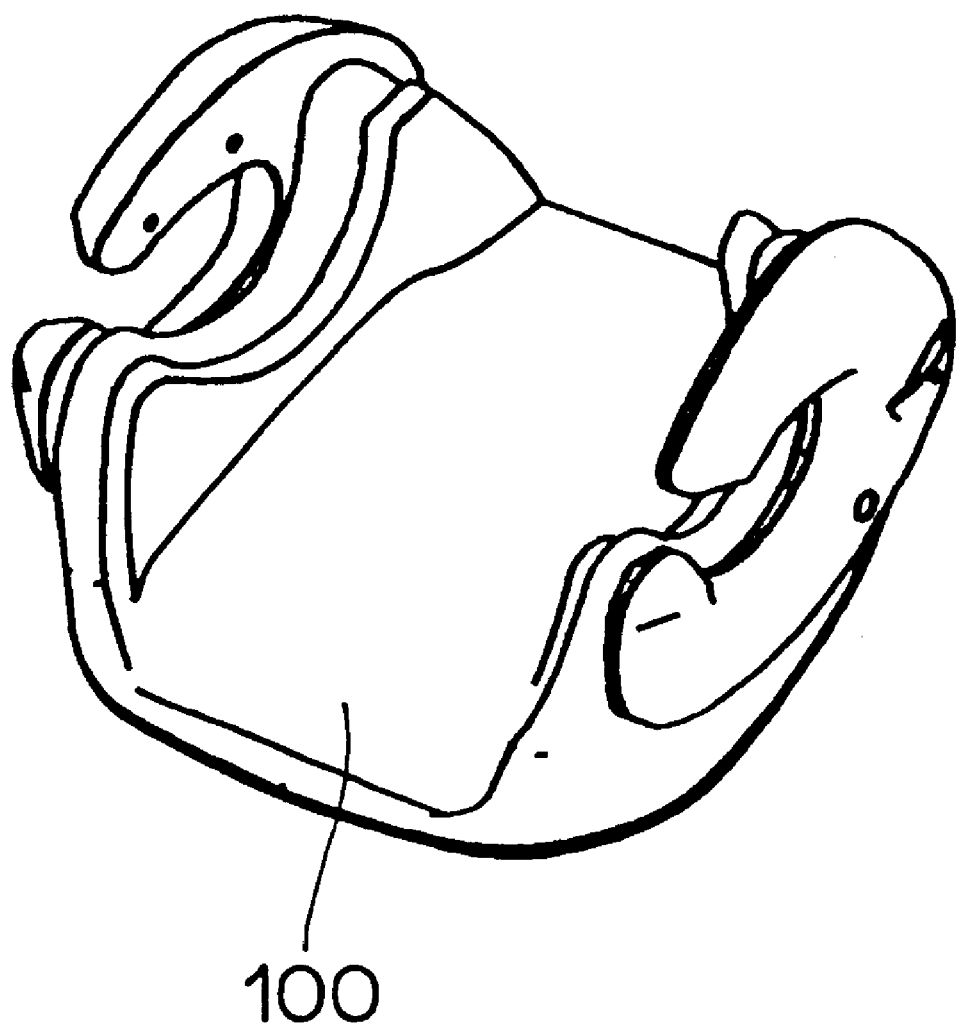
FIG. 21 is a perspective view showing the child & junior seat 1 employed as a junior seat.

When an impact shield 300 is provided as shown in FIG. 20 and the child & junior seat 1 according to each of the aforementioned embodiments is fixed with a seat belt provided on a car, the child & junior seat 1 can be employed as a child seat enabling a space between the impact shield 300, the seat portion 100 and the backrest portion 200 to support the juvenile. When the backrest portion 200 is detached from the seat portion 100 as shown in FIG. 21, the child & junior seat 1 can be employed as a junior seat provided with only the seat portion 100.

If the juvenile safety car seat according to the present invention, the support space can be brought into the optimum state in response to growth of the head region and the shoulder regions of the juvenile due to provision of the outwardly movable side guards. The support space can also be brought into the optimum state in response to growth of the height of the juvenile due to provision of the mechanism for adjusting the vertical position of the backrest portion. Consequently, the juvenile safety car seat can be improved in safety and comfortableness.

Although the present invention has been described and illustrated in detail, it is clearly understood that the same is by way of illustration and example only and is not to be taken by way of limitation, the spirit and scope of the present invention being limited only by the items of the appended claims.

What is claimed is:

1. A juvenile safety car seat comprising a seat portion and a backrest portion for supporting a juvenile in a car,
    further comprising a pair of side guards outwardly movably provided on both sides of said backrest portion for protecting a head region and shoulder regions of the juvenile,
    wherein said side guards are provided to be capable of increasing respective distances between said side guards and the shoulder regions of the juvenile while keeping respective distances between said side guards and the head region of the juvenile substantially constant.

2. The juvenile safety car seat according to claim 1, wherein first regions of said side guards coming into contact with the head region of the juvenile and second regions of said side guards coming into contact with the shoulder regions of the juvenile are visually partitioned from each other in said side guards.

3. The juvenile safety car seat according to claim 1, wherein said side guards are so mounted that upper end regions are rotatable with respect to said backrest portion for outwardly opening lower end regions of said side guards.

4. The juvenile safety car seat according to claim 1, further comprising an interlocking link mechanism provided for said side guards for simultaneously enabling adjustment of a spacing distance between said side guards.

5. The juvenile safety car seat according to claim 4, wherein said interlocking link mechanism includes a mechanism for outwardly opening only lower end regions of said side guards.

6. The juvenile safety car seat according to claim 1, wherein said side guards have upper side guards and lower side guards respectively.

7. The juvenile safety car seat according to claim 6, so provided that the quantity of outward movement of said lower side guards is greater than the quantity of outward movement of said upper side guards.

8. The juvenile safety car seat according to claim 7, further comprising interlocking link mechanisms provided for said upper side guards and said lower side guards for simultaneously enabling adjustment of spacing distances between said upper side guards and said lower side guards respectively.

9. The juvenile safety car seat according to claim 1, further comprising vertical position adjusting means for adjusting a vertical position of said backrest portion.

10. The juvenile safety car seat according to claim 9, wherein said vertical position adjusting means includes:
    a plate fixed to said seat portion and provided to upwardly extend,
    a guide region provided on said backrest portion for guiding said plate so that said backrest portion is vertically slidable along said plate, and
    fixing means for fixing a selected vertical position of said backrest portion.

11. The juvenile safety car seat according to claim 10, wherein said guide region has a receiving space for receiving said plate in the range of the thickness of said backrest portion.

12. The juvenile safety car seat according to claim 10, wherein said fixing means includes:
    an elastic member provided on either one of said plate and said guide region and a plurality of engaging regions vertically provided on the other one of said plate and said guide region for engaging with said elastic member.

13. A juvenile safety car seat for supporting a juvenile in a car, comprising:
    a seat portion;
    a backrest portion connected to said seat portion;
    a pair of side guards outwardly movably provided on left and right sides of said backrest portion for protecting a head and shoulder regions of said juvenile; and
    vertical position adjusting means for adjusting a vertical position of said backrest portion relative to said seat portion;

wherein said vertical position adjusting means include:
a plate fixed to said seat portion and extending upwardly therefrom,
a guide region provided on said backrest portion for guidingly receiving said plate so that said backrest portion is vertically slidable along said plate, and
fixing means for fixing a selected vertical position of said backrest portion along said plate.

14. A safety car seat for supporting a juvenile, comprising:
a seat bottom positioned to allow the juvenile to sit thereon;
a backrest connected to and extending upwardly from said seat bottom, and positioned to support a back of the juvenile resting thereagainst; and
left and right side guards respectively arranged at and protruding forwardly from left and right sides of said backrest;
wherein said side guards each respectively include a respective upper side guard portion positioned so as to laterally guard a head of the juvenile, and a respective lower side guard portion positioned so as to laterally guard a respective shoulder of the juvenile; and
wherein said upper side guard portions and said lower side guard portions of said left and right side guards are connected to said backrest so that at least said lower side guard portions are laterally movable relative to said backrest, and a first lateral spacing distance between said lower side guard portions is adjustably variable to a greater extent than a second lateral spacing distance between said upper side guard portions.

15. The safety car seat according to claim 14, wherein said lower side guard portions are laterally movable relative to said backrest so that said first lateral spacing distance is adjustably variable while said second lateral spacing distance remains substantially constant.

16. The safety car seat according to claim 1, wherein each one of said left and right side guards respectively integrally includes a respective one of said upper side guard portions and a respective one of said lower side guard portions integrally and continuously connected to each other.

17. The safety car seat according to claim 16, wherein each one of said upper side guard portions is pivotably connected to said backrest at a respective pivot axis relatively close to said upper side guard portion and relatively far from said lower side guard portion, so that said left and right side guards are respectively laterally pivotable about said pivot axes.

18. The safety car seat according to claim 17, wherein said pivot axes respectively extend perpendicularly to a plate of said backrest.

19. The safety car seat according to claim 16, further comprising an adjustment knob, a left adjustment link connected between said left side guard and said adjustment knob, and a right adjustment link connected between said right side guard and said adjustment knob, wherein said adjustment knob cooperates with said left and right adjustment links to simultaneously laterally move said left and right side guards.

20. The safety car seat according to claim 14, wherein said upper side guard portion and said lower side guard portion of each one of said left and right side guards are respectively an upper side guard member and a lower side guard member that are separate and non-integral with respect to each other.

21. The safety car seat according to claim 20, wherein said upper side guard member and said lower side guard member of each one of said left and right side guards are respectively individually laterally slidably connected to said backrest so as to be linearly laterally slidable relative to said backrest.

22. The safety car seat according to claim 21, wherein a range of sliding of said lower side guard members is greater than a range of sliding of said upper side guard members.

23. The safety car seat according to claim 20, further comprising an adjustment knob, a left adjustment link connected to said upper and lower side guard members of said left side guard and to said adjustment knob, and a right adjustment link connected to said upper and lower side guard members of said right side guard, wherein said adjustment knob cooperates with said left and right adjustment links to simultaneously laterally move said upper and lower side guard members of said left side guard and said upper and lower side guard members of said right side guard.

* * * * *

UNITED STATES PATENT AND TRADEMARK OFFICE
CERTIFICATE OF CORRECTION

PATENT NO. : 6,478,377 B2
DATED : November 12, 2002
INVENTOR(S) : Kassai et al.

It is certified that error appears in the above-identified patent and that said Letters Patent is hereby corrected as shown below:

Title page,
Item [57] ABSTRACT,
Line 13, after "growth", replace "state" by -- stage --.

Column 7,
Line 29, after "210U.", delete "com-" and
Line 30, and replace the line with the following text:
-- Consequently, the side guards 210U and 210D can be simultaneously adjusted by providing the aforementioned interlocking link mechanism 220B, for improving handleability of the child & junior seat 1.

From early childhood to school age, the shoulder portions (the breadth of the shoulders) of the juvenile grow at a higher degree than the head portion. Therefore, a support space for the juvenile can be optimally changed in response to growth of the juvenile by providing the lower side guards 210D coming into contact with the shoulder portions to be outwardly openable beyond the upper side guards 210U, for further improving the safety and comfortableness of the juvenile safety car seat.

While the mechanism for interlocking the right and left side guards 210U and 210D has been described as a perferable example, a mechanism for adjusting the positions of the side guards 210U and 210D independently of each other can alternatively be employed.

In the child & junior seat 1 according to each of the aforementioned embodiments, regions of the side guards 210 coming into contact with the head region of the juvenile and those coming into contact with the shoulder regions are preferably visually partitioned from each other. For example, different colors may be supplied to the regions coming into contract with the head region and those coming into contact with the shoulder regions for clearly distinguishing the regions from each other, or lines may be provided on the boundaries between the regions coming into contact with the head region and those coming into contact with the shoulder regions.

UNITED STATES PATENT AND TRADEMARK OFFICE
CERTIFICATE OF CORRECTION

PATENT NO.    : 6,478,377 B2
DATED         : November 12, 2002
INVENTOR(S)   : Kassai et al.

It is certified that error appears in the above-identified patent and that said Letters Patent is hereby corrected as shown below:

Column 7 cont'd,
    When the regions coming into contact with the head region of the juvenile and those coming into contact with the shoulder regions are visually partitioned from each other as described above, the child & junior seat 1 can supply a sense of security to the user, thereby improving comfortableness for the user. --

Signed and Sealed this

Sixteenth Day of September, 2003

JAMES E. ROGAN
*Director of the United States Patent and Trademark Office*